United States Patent Office 3,318,973
Patented May 9, 1967

3,318,973
COMPOSITION CONTAINING A POLYALKYLENE POLYSULFIDE, AN ACRYLATE RESIN, AND A POLYEPOXIDE
Edward D. Hill, 3140 W. 32nd St., Cleveland, Ohio 44109
No Drawing. Filed Apr. 20, 1964, Ser. No. 361,281
14 Claims. (Cl. 260—837)

The present invention relates to a polysulfide material that is compatibly plasticized with a polyacrylate resin and, more particularly, to an ink transfer member composed of such material.

It is known to provide an inking roller with a surface consisting essentially of a polysulfide polymer and especially a polyalkylene polysulfide as shown in Hill, United States Patent 2,538,751. However, polysulfides are preferably plasticized in order to obtain a desired range of softness, for example, a durometer Shore A value of about 10 to about 30.

One generally popular plasticizer comprises the various polyacrylates. Nevertheless, polyacrylates were not previously used to any substantial extent to plasticize a polysulfide because of an inherent incompatibility between the two materials. If a roller, for example, was made from a polysulfide and plasticized with a polyacrylate, the latter tended to be fugitive and in time would leave the roller.

A still further practice in the preparation of an inking or transfer roller is to machine or grind the roller, as by an abrasive wheel, to "true" the exposed or impression face. As an instance, a printing roller may be cast in a mold about a roller core as taught by United States Patent 2,536,233 to Spencer. Thereafter, it is the practice to grind the cast roller to a desired diametral size.

I have now developed an improved ink transfer member which obviates the foregoing objectives as well as the need for a grinding or truing operation. In the present invention, a compatible plasticization of a polysulfide with a polyacrylate is accomplished by the addition of an epoxy compound. Further the resulting material need not be, and preferably is not, subjected to any additional processing step such as grinding.

It is therefore a principal object of the present invention to provide a novel method of compatibly plasticizing a polysulfide with an acrylate resin and the resulting product.

Another object is to provide an improved ink transfer member.

A further object is to provide an ink transfer member, such as a roller or the like, having an inherent tackiness and no need for a final shaping or grinding operation.

Other objects will be apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

As indicated, the incompatibility of the polyacrylate plasticizer for a polysulfide has been overcome by a bridging agent in the form of epoxy compound. In short, the present invention accomplishes two objectives:

(1) It overcomes the previous incompatibility of a polyacrylate as a plasticizer for a polysulfide, and
(2) The resulting material still has a durometer hardness within a desirable range, such as a durometer Shore A value of about 10 to about 30.

Considering in greater detail the specified components, the polysulfide contemplated is elastomeric in nature and well known in the art. In general, the polysulfide may be a polyalkylene polysulfide. Exemplary of the latter are those polysulfides which may be termed polyalkylene-polyether-polysulfides or mercaptan-terminated polysulfides. A polysulfide found to be especially satisfactory in practicing the present invention is that characterized by the following formula:

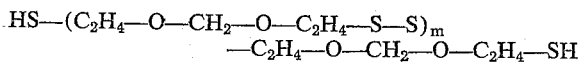

wherein $m$ represents a positive integer of from about 3 to about 23. These polymers are liquid at room temperature (about 75° F.) and have a molecular weight within the range of about 500 to about 4,000. Such liquid polymers are commercially available under the trademark "Thiokol."

Instead of these polysulfide polymers, it is also possible to employ polyhydroxy polythio polymers disclosed in United States Patent 2,527,375, and the polythiopolymer-captans having a molecular weight of about 500 to about 12,000, the preparation of which is described in United States Patent 2,466,963. The patents herein specified are hereby incorporated by reference. As used here and in the claims, the term "polysulfide polymer" is intended to mean polysulfides of the type described supra.

The polyacrylate used as a plasticizer is also well known in the art. A wide variety of polyacrylates may be employed, especially since there does not appear to be a reaction with the polysulfide but rather a true plasticizing effect or "averaging" of physical properties. The acrylate resin used is initially in liquid form at room temperatures (about 75° F.) and, accordingly, there is no criticality as to the extent of polymeric growth of the polyacrylate as long as it is stll in liquid form for admixing with the other components. Indeed, the liquid form requirement is also true of the other two defined classes of components herein contemplated, so that admixture of all components can be easily accomplished with subsequent solidification. Desirably, the polyacrylate resin is a polymer formed from a monomer selected from the group consisting of the lower alkyl esters of acrylic acid and of methacrylic acid. Exemplary of these polyacrylate resins contemplated are those characterized by the formula:

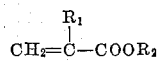

wherein $R_1$ is selected from the group consisting of hydrogen and methyl, and $R_2$ is an alkyl group of one to four carbon atoms. However, it is not intended to exclude by the term "polyacrylate resin" those polyacrylates which are formed from hydroxyl-substituted acrylates or still other substituted acrylates, wherein the substitution does not affect the plasticizing of polysulfide.

One polyacrylate of the general type described that has been found to be very satisfactory in practicing the invention is sold under the trademark "Paraplex." This acrylate is a clear liquid having a specific gravity at 25° C. of 1.10 and a viscosity at the same temperature of 9 to 11 centipoises.

The epoxy compound is of course characterized by the epoxy group:

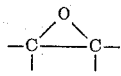

and preferably contains two of such groups. The remaining structure of the epoxy compound is not found to be critical. The epoxy compounds of the present invention may be at least bifunctional with respect to the epoxy groups, and they may moreover have a functionality greater than 2. The epoxy compound may be of monomeric or polymeric form but is preferably in polymeric form, although, as initially used, the polymer is still in the liquid state.

More particularly, by "epoxy resin" is meant the reaction products of polyfunctional halohydrins (for example epichlorhydrin) with polyhydric alcohols and/or phenols (for example, Bisphenol A) to produce polyglycidyl ethers of polyhydric alcohols, and especially dihydric alcohols, and glycidyl ethers of bisphenols. The typical formula is usually represented as:

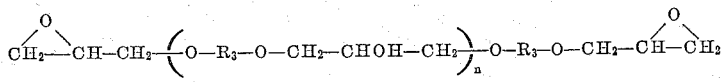

wherein $R_3$ represents a divalent hydrocarbon radical of dihydric phenol, for example:

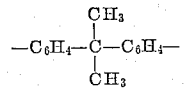

and wherein $n$ represents the extent of polymerization as determined by the epoxy equivalent which may range from about 140 to about 4,000. By the epoxy equivalent is meant the average number of 1,2-epoxy groups contained in the average molecule. It is expressed as the grams of the polymeric material or resin containing one gram equivalent of epoxide. Several suitable polymers or resins of this type are available on the market, such as those sold under the trademark "Epon."

Proportions are not critical. Any amount of the polyacrylate will of course afford some plasticization of the polysulfide. Normally, the amount of the polyacrylate used ranges from about 5 percent to about 45 percent by weight of the polysulfide. Similarly, any amount of an epoxy compound will afford some advantage as herein contemplated. Usually, an amount of the epoxy compound is used ranging from about 3 percent to about 40 percent by weight of the polyacrylate.

It is within the contemplation of the present invention to add other known ingredients and fillers such as carbon black. Also, catalysts known in the art may be employed to hasten the setting and solidification of the admixture, for example, about 5 percent by weight of the polysulfide of m-dinitrobenzene and about 1 to 5 percent by weight of the polysulfide of tellurium oxide. These additions are known to those skilled in the art and therefore not here discussed in further detail.

*Example*

The ink transfer member may take various forms, since it is the exposed surface or impression face which is significant and which comprises the present tri-part composition. Ordinarily, the ink transfer member is in roller form.

In one instance, eight parts of polymethacrylate in liquid form was admixed with eighteen parts by weight of a polyalkylene polysulfide, also in liquid form. An epoxy resin sold under the trademark Epon was then added equal in weight to one-fourth of the weight of the acrylate, the epoxy resin also being in liquid state. The ingredients were mixed under vacuum and cast without heating. Just before molding the resulting admixture, dinitrobenzene in an amount of 0.2 percent by weight was added.

The mold used was a standard mold for casting cylindrical inking rollers. The mold and cast admixture were then heated for one hour at 180° F. in an air-circulating oven. The roller had hardened by this time and could be removed from the mold.

One important feature of the present invention is to use the roller as cast and set, that is, without grinding or "truing" its surface. The unground surface of the roller of the present composition has a material tackiness which very appreciably aids the acceptance and transfer of ink.

If the surface of the present roller or other ink-transfer member is abraded as by grinding in order to bring its thickness or size within dimensional tolerances, this inherent tackiness is destroyed. The resulting roller of this example remaining plasticized with the polyacrylate. It was especially suited for use with heat-set inks.

Other forms embodying the features of the invention may be employed, change being made as regards the features herein disclosed, provided those stated by any of the following claims or the equivalent of such features be employed.

I therefore particularly point out and distinctly claim as my invention:

1. As a composition of matter, a predominent amount of a polyalkylene polysulfide, a plasticizing amount of an acrylate resin selected from the group consisting of the lower alkyl esters of acrylic acid, methacrylic acid, hydroxyalkyl acrylates, and hydroxy-alkyl methacrylates, and a sufficient amount of an epoxy resin selected from the group consisting of polyglycidyl ethers of polyhydric phenols and polyglycidyl ethers of polyhydric alcohols to render the polysulfide and acrylate resin compatible, said sufficient amount being no greater than the amount of said acrylate resin.

2. The composition of matter of claim 1 wherein said acrylate resin is present in an amount of about 5 percent to about 45 percent by weight of said polysulfide, and said epoxy resin is present in an amount of about three percent to about 40 percent by weight of said acrylate resin.

3. The composition of matter of claim 1 wherein said polyglycidyl ethers of polyhydric phenols have an epoxy equivalent of about 140 to about 4000.

4. The composition of matter of claim 1 in the form of an ink transfer member having a cast unground solid impression face retaining inherent tackiness.

5. The composition of matter of claim 1 wherein said plasticizing amount of the acrylate resin is sufficient to impart a Shore A hardness of about 10 to about 30.

6. The composition of matter of claim 1 wherein said polyalkylene polysulfide is a polythiopolymercaptan.

7. An ink transfer member consisting essentially of the material resulting from heating in admixture
   (a) a polysulfide characterized by the formula:

$$HS-(C_2H_4-O-CH_2-O-C_2H_4-S-S)_m-$$
   $$C_2H_4-O-CH_2-O-C_2H_4-SH$$

wherein $m$ is a positive integer of from 3 to 23;
   (b) a plasticizing amount of a polymer liquid at room temperature and formed by a monomer characterized by the formula:

$$CH_2=\overset{R_1}{\underset{}{C}}-COOR_2$$

wherein $R_1$ is a substituent selected from the group consisting of hydrogen and methyl, and $R_2$ is an alkyl group of 1 to 4 carbon atoms; and
   (c) a sufficient amount of a glycidyl polyether of a polyhydric phenol to render the mixture of components a and b compatible, said sufficient amount being no greater than the amount of component b.

8. A method of preparing an ink transfer member comprising heating in admixture a composition consisting essentially of
   (a) a polysulfide characterized by the formula:

$$HS-(C_2H_4-O-CH_2-O-C_2H_4-S-S)_m-$$
   $$C_2H_4-O-C_2H_4-SH$$

wherein $m$ is a positive integer of from 3 to 23;

(b) a plasticizing amount of a polymer liquid at room temperature and formed by a monomer characterized by the formula:

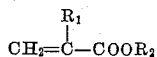

wherein $R_1$ is a substituent selected from the group consisting of hydrogen and methyl, and $R_2$ is an alkyl group of 1 to 4 carbon atoms; and (c) a sufficient amount of a glycidyl polyether of a polyhydric phenol to render the mixture of components *a* and *b* compatible, said sufficient amount being no greater than the amount of component *b*.

9. The method of claim 8 wherein said admixture is cast in a mold prior to said heating step to provide the resulting molded ink transfer member with an impression face, and said member is then used to transfer ink in the absence of any surface treatment for said impression face.

10. The method of claim 8 wherein said plasticizing amount of the polyacrylate resin is sufficient to impart a Shore A hardness of about 10 to about 30.

11. The method of claim 8 wherein said polysulfide is a polythiopolymercaptan.

12. In the method of plasticizing a polyalkylene polysulfide with a plasticizing amount of an acrylate resin selected from the group consisting of the lower alkyl esters of acrylic acid, methacrylic acid, hydroxy-alkyl acrylates, and hydroxy-alkyl methacrylates, the improvement of adding a sufficient amount of epoxy resin selected from the group consisting of polyglycidyl ethers of polyhydric phenols and polyglycidyl ethers of polyhydric alcohols to render the polysulfide and acrylate resin compatible, said sufficient amount being no greater than the amount of said acrylate resin.

13. The method of claim 12 wherein said acrylate resin is present in an amount of about 5 percent to about 45 percent by weight of said polysulfide, and said epoxy resin is present in an amount of about three percent to about 40 percent by weight of said acrylate resin.

14. The method of claim 12 wherein said polyglycidyl ethers of polyhydric phenols have an epoxy equivalent of about 140 to about 4000.

No references cited.

MURRAY TILLMAN, *Primary Examiner.*

P. L. LIEBERMAN, *Assistant Examiner.*